Patented Jan. 26, 1954

2,667,443

UNITED STATES PATENT OFFICE 2,667,443

DENTAL FLOSS

William Howard Ashton, Philadelphia, Pa., assignor to Johnson & Johnson, a corporation of New Jersey No Drawing. Application May 14, 1949, Serial No. 93,413

4 Claims. (Cl. 167—93)

The present invention relates to dental floss and dental tape impregnated with chemicals for the purpose of increasing the resistance of teeth to dental caries.

Dental caries is the decay of the teeth which is associated with micro-organisms, carbohydrates, and acids. The exact mechanism is not clearly understood but is felt to be a direct function of acids (chiefly lactic acid) which are produced by action of the bacteria on the carbohydrates.

Dental researchers have shown that caries does not occur in persons having a saliva above pH 5.0.

The interproximal regions are of particular concern to the dental profession where continual prophylaxis should be maintained to insure greatest resistance to dental caries. Particles of food (carbohydrates, meat fibres, etc.) are trapped in these regions and often become incapable of removal by natural reflexes. Dental floss or dental tape is used to remove these trapped bodies from these regions where other means such as brushing cannot penetrate. Subsequent disintegration of these food particles if not removed, provide a media for the growth of detrimental micro-organisms which give off acids, or enzymes which cause acids, and therefore account for a certain percentage of dental caries in these interproximal regions.

It is, therefore, an object of the invention to incorporate chemical agents in dental floss designed to assist in the prevention of dental caries. More specifically, the invention involves the incorporation or impregnation of dental floss or dental tape, or any similar suitable yarn or tape, with chemicals which will act as medicaments to:

1. assist in enamel growth and thereby increase resistance to dental caries;
2. protect enamel or dentine by the preferential coating of insoluble precipitates;
3. react with, neutralize, sequester, buffer, or counteract acids which are present in the saliva or those which are produced therein by bacteria or subsequent enzymatic disintegration of foreign particles lodged in the interproximal regions of the teeth.

Sodium biphosphate up to 20% by weight can be incorporated into yarns to assist in the topical application of this salt to the teeth or their interproximal regions. When a yarn has a coating or a binder such as beeswax, a petroleum wax, a resin, resinous wax-like material or a water soluble wax-like material (e. g. solid ethylene glycol polymer or derivative) this salt may be incorporated in the binder. Water soluble cellulose derivatives such as methyl cellulose or sodium carboxymethyl cellulose are also efficient binders for yarns impregnated with this salt.

Such salts or mixtures may be incorporated or impregnated in the yarn by dry mechanical impregnation of the powdered salt or mixture; solution in water of the salt and water soluble binder in which the yarn is soaked; mixture of the salt in a molten bath of the binder through which the yarn is drawn and subsequently allowed to cool to permit solidification of the binder and salt mixture.

Dr. B. Gottlieb has developed a method of coating the teeth which is felt to produce an impenetrable film over the enamel and thus make it more resistant to attack by any of the causes of dental caries. This method consists in coating the treated teeth with zinc chloride and subsequently with potassium ferrocyanide which presumably forms an insoluble precipitate of zinc ferrocyanide as a protective coating. The use of zinc chloride has also been investigated by others who have had some success in its use. Zinc chloride appears to have an affinity for the proteolytic components of the teeth.

Zinc chloride or potassium ferrocyanide may be incorporated or impregnated in dental floss or dental tape by the methods described in the above section as well as with any of the binders mentioned.

Chemicals may be incorporated or impregnated in dental floss or dental tape which when forced into the interproximal regions of the teeth will neutralize, sequester, buffer, or counteract any acids occluded therein.

Compounds which may be used and applied in or onto the yarn or fabric by the above described methods, with or without any of the binders or mixtures thereof include:

1. Aliphatic amines, e. g. tricetyl amine;
2. Cyclic amines, e. g. hexamethylene tetramine;
3. Fatty acid amides containing less than 25 carbon atoms, e. g. stearamide;
4. Basic amino acids, e. g. lysine;
5. Polypeptides, e. g. glycylglycine;
6. Inorganic basic salts such as $(NH_4)_2CO_3$, $Na_2HPO_4$, $(NH_4)_2HPO_4$, $CH_3COONa$, $K_2HPO_4$, etc.;
7. Compounds which will give rise to basic products as a result of reaction or disintegration in the interproximal regions, e. g. urea or biuret;
8. Mixtures of any of the above to total 20% by weight of the yarn;
9. The specific combination of urea dibasic ammonium phosphate as disclosed by Kesel;
10. Coating with cellulosic ether amides to act as neutralizing agents.

Yarns and materials which can be impregnated and are suitable for this purpose include as follows:

Linen, silk, cotton, vinyon, nylon and other synthetic fibres or mixtures of all or any. Yarns may be braided, spun, thrown or fused with or without twist. Paper tapes or fibre backed paper tapes are also suitable and can be impregnated with the described agents. Natural cords such as catgut are suitable.

In order more clearly to disclose the invention and the manner in which it may be carried into practice, several specific examples will now be described in detail. It should be clearly understood, however, that these examples are included solely for purposes of illustration and not with the object of delineating the breadth of the invention or limiting the scope of the appended claims.

*Example I.—(Dry impregnation)*

A. Urea or dibasic ammonium phosphate or any mixtures thereof in the dry state and finely divided condition is impregnated in silk or nylon of 300 to 2500 total denier by being mechanically forced into the yarn.

This impregnation is accomplished best by the use of wooden wringer rolls, preferably end grain maple, onto which, or prior to which, the urea dibasic ammonium phosphate is dusted, on the yarn or rollers, or picked up thereby. The vertical pressure of the rollers is adjusted to force the dry urea dibasic ammonium phosphate into the interstices of the yarn depending on the yarn or the torque of the wringer rolls. The impregnation proceeds satisfactorily up to 20% by weight urea dibasic ammonium phosphate based on the weight of the yarn. A desirable degree of impregnation is 3 to 7% on a dry weight basis. Specific mixtures of 5 parts urea to 3 parts dibasic ammonium phosphate are dusted onto the moving wringer rolls through which a welded yarn, e. g. "Nymo," is drawn.

B. Zinc chloride, potassium ferrocyanide, or any mixtures thereof are impregnated as above described, into dry silk or a welded nylon monocord such as that sold by Belding Heminway Corticelli, under the trade-mark "Nymo." Other fibers are also satisfactory as previously described.

*Example II.—(Water solution impregnation)*

A water solution of the soluble salts previously noted is used to incorporate chemicals in yarns. When the treated yarn is desired dry the water is evaporated therefrom leaving the dissolved ingredient occluded in the yarn.

A. Silk may be drawn through a mixture consisting of 10 parts urea, 10 parts dibasic ammonium phosphate, and 100 parts of water to result in a wet weight pick up of 130% of the dry weight of the silk.

B. A welded nylon monocord such as the above mentioned "Nymo" is treated by drawing it through a mixture consisting of

| | Parts |
|---|---|
| $(NH_4)_2HPO_4$ | 20 |
| $(NH_2)_2CO$ | 20 |
| Sodium carboxymethyl cellulose | 1 |
| $C_4H_9CH(C_2H_5)CH_2SO_4Na$ (Tergitol 08) | 0.1 |
| Water | 200 |

C. The above formulation is used except that in place of sodium carboxymethyl cellulose, one of the following or related binders or mixtures thereof is employed:

(1) Glue
(2) Gelatin
(3) Methyl cellulose
(4) Tragacanth
(5) Gum Arabic
(6) Algin

*Example III.—Impregnation with waxes*

A. Medicaments are mixed with molten wax through which the yarn is drawn and the wax coating containing the salts allowed to set, resulting in a yarn bound with wax containing the medicaments in solid suspension, solid solution, or partial solution. For example, dry crystalline urea, dibasic ammonium phosphate or other solid compounds mentioned previously of 100 mesh or finer is added to molten beeswax maintained at 10° F. to 50° F. above the setting point. 35 filament 15 end 70 denier or total 1050 denier nylon yarn is drawn through the wax medicament mixture containing 20% by weight of medicament. A waxed medicament coated yarn results yielding up to 60% coating per weight of untreated yarn.

B. Medicaments are sifted or dusted onto the waxed yarn while wax is still semisolid or tacky enough to provide adequate adhesion.

A mixture of 5 parts urea to 3 parts dibasic ammonium phosphate is sifted onto 1050 total denier wax coated nylon yarn at a high enough temperature to maintain the wax soft. Dusting is controlled to give a salt content of 6% of the total weight of treated yarn. Cooling below its setting temperature sets the wax on the yarn and the medicaments are distributed thereon.

Another method of treating the above consists in drawing the waxed yarn at a high enough temperature to maintain the wax soft through a pile of the sifted medicaments.

Waxes giving suitable adhesion are:

Beeswax
Microcrystalline waxes
Synthetic waxes
Water-soluble waxes.

Solid polyethylene glycols ("Carbowax") are suitable vehicles and water-soluble binders for impregnated yarns.

Impregnation is effected using a mixture consisting of 40 parts "Carbowax" 4000
10 parts "Carbowax" 1540
5 parts $(NH_2)_2CO:(NH_4)_2HPO_4::5:3$ When 10 end 100 denier nylon yarn is drawn through the above mixture at 130° F. followed by cooling, an impregnated yarn bound with the water soluble wax and incorporated medicaments results.

C. Other mixtures of polyethylene glycols may be used as well as previously mentioned medicaments or mixtures thereof.

*Example IV.—(Resin binders and impregnation)*

Yarns to be impregnated with medicaments using a resinous binder are drawn through a suitable solution of the resin, the solvent serving as a vehicle as well as being volatile. After the resin coating is applied the solvent is evaporated and temperature regulated and velocity of yarn controlled to apply the dry medicaments at a point where the resin is just undercured or still tacky enough to retain the medicaments on the surface of the yarn. Subsequent cooling or baking converts the resin to stable form.

Nylon yarn is drawn through a solution containing 64% water, 31% resorcinol-formaldehyde, 5% formaldehyde at 70° F. The coated yarn is heated at 180° F. for two minutes or until curing has just occurred. Finely divided medicament is then dusted onto the coated yarn or forced therein by rollers resulting in a resin bound and coated yarn treated with medicament. Other resins may be substituted for resorcinol-formaldehyde.

It will be apparent to those skilled in the art that many variations may be made in the procedures and compositions described in the foregoing examples, without departing from the spirit or scope of the inventive concept. I, therefore, intend to be limited only insofar as required by the prior art and the appended patent claims.

I claim:
1. Dental floss impregnated with a dental medicament in a water-soluble solid wax.
2. Dental floss impregnated with a medicament mixture of urea and dibasic ammonium phosphate in a water-soluble solid wax.
3. Dental floss impregnated with a medicament mixture of urea and dibasic ammonium phosphate in a water-soluble polyglycol wax.
4. Dental floss comprising a welded cord impregnated with a medicament mixture of urea and dibasic ammonium phosphate in a water-soluble poly-glycol wax.

WILLIAM HOWARD ASHTON.

References Cited in the file of this patent

UNITED STATES PATENTS

| Number | Name | Date |
|---|---|---|
| 185,666 | Brown | Dec. 26, 1876 |
| 1,069,874 | Hanscomb | Aug. 12, 1913 |
| 1,285,988 | Gudebrod | Nov. 26, 1918 |
| 1,839,483 | Lawton | Jan. 5, 1932 |
| 1,989,895 | Gilder | Feb. 5, 1935 |
| 2,224,489 | Rozenbroek | Dec. 10, 1940 |
| 2,464,755 | Taub | Mar. 15, 1949 |

FOREIGN PATENTS

| Number | Country | Date |
|---|---|---|
| 145,983 | Austria | May 25, 1936 |

OTHER REFERENCES

"Carbowax Compounds and Polyethylene Glycols," pages 3, 4 and 5, The Carbide and Carbon Chemicals Corp., 30 E. 42d Street, N. Y. C., June 1946.

Kesel et al., Drug and Cosmetic Industry, October 1947, pages 524 and 525.

Dodge, American J. Pharm., April 1945, pages 137 to 146 (pages 142–144 pertinent).

J. Am. Dent. Assn., volume 34, January 1947, pages 26 to 32.